United States Patent
Herz et al.

(10) Patent No.: US 8,665,311 B2
(45) Date of Patent: Mar. 4, 2014

(54) METHODS AND APPARATUS FOR COLLABORATION

(75) Inventors: Erik Herz, Farmington, CT (US); Douglas Uhl, Harwinton, CT (US)

(73) Assignee: vBrick Systems, Inc., Wallingford, CT (US)

( * ) Notice: Subject to any disclaimer, the term of this patent is extended or adjusted under 35 U.S.C. 154(b) by 331 days.

(21) Appl. No.: 13/029,988

(22) Filed: Feb. 17, 2011

(65) Prior Publication Data

US 2012/0212570 A1 Aug. 23, 2012

(51) Int. Cl.
*H04N 7/14* (2006.01)
*G06F 15/16* (2006.01)

(52) U.S. Cl.
USPC ... 348/14.08; 370/230; 370/260; 375/240.01; 379/88.11; 379/88.13; 380/28; 455/466; 600/300; 600/545; 704/208; 705/14.49; 707/770; 709/203; 709/204; 709/206; 709/207; 709/231; 713/323; 715/751; 715/753; 715/759; 725/32; 725/87; 725/88; 725/114; 726/24

(58) Field of Classification Search
USPC .......... 348/14.08; 370/260, 230; 375/240.01; 379/88.11, 88.13; 380/28; 455/466; 600/300, 545; 704/208; 705/14.49; 707/770; 709/203, 204, 205, 206, 207, 709/231; 713/323; 715/753, 759, 751; 725/32, 87, 88, 114; 726/24
See application file for complete search history.

(56) References Cited

U.S. PATENT DOCUMENTS

| | | | |
|---|---|---|---|
| 5,596,994 A * | 1/1997 | Bro | 600/545 |
| 6,061,449 A * | 5/2000 | Candelore et al. | 380/28 |
| 7,167,899 B2 * | 1/2007 | Lee et al. | 709/204 |
| 7,551,573 B2 * | 6/2009 | Baird et al. | 370/260 |
| 7,937,734 B2 * | 5/2011 | Haddad | 725/87 |
| 8,024,661 B2 * | 9/2011 | Bibliowicz et al. | 715/751 |
| 8,185,828 B2 * | 5/2012 | Liu et al. | 715/753 |
| 8,250,141 B2 * | 8/2012 | Xiao et al. | 709/204 |
| 8,255,966 B2 * | 8/2012 | Shusman | 725/114 |
| 8,542,581 B2 * | 9/2013 | Chen et al. | 370/230 |
| 2004/0117451 A1 * | 6/2004 | Chung | 709/207 |
| 2007/0112971 A1 * | 5/2007 | Noff et al. | 709/231 |
| 2007/0157264 A1 * | 7/2007 | Garfinkle | 725/88 |
| 2008/0101456 A1 * | 5/2008 | Ridge et al. | 375/240.01 |
| 2008/0215682 A1 * | 9/2008 | Vilis | 709/204 |
| 2008/0301232 A1 * | 12/2008 | Facemire et al. | 709/205 |
| 2008/0312948 A1 * | 12/2008 | Kalliola | 705/1 |
| 2009/0098893 A1 * | 4/2009 | Huang | 455/466 |
| 2010/0114947 A1 * | 5/2010 | Eftekhari | 707/770 |
| 2010/0131868 A1 * | 5/2010 | Chawla et al. | 715/759 |
| 2010/0135473 A1 * | 6/2010 | Dewing et al. | 379/88.13 |
| 2010/0146063 A1 * | 6/2010 | Lidin et al. | 709/206 |
| 2010/0175084 A1 * | 7/2010 | Ellis et al. | 725/32 |
| 2010/0223320 A1 * | 9/2010 | Huang et al. | 709/203 |
| 2010/0226483 A1 * | 9/2010 | den Hartog | 379/88.11 |
| 2010/0228824 A1 * | 9/2010 | Lin et al. | 709/204 |
| 2011/0010774 A1 * | 1/2011 | Park et al. | 726/24 |
| 2011/0099006 A1 * | 4/2011 | Sundararaman et al. | 704/208 |
| 2011/0172499 A1 * | 7/2011 | Simons-Nikolova et al. | 600/300 |
| 2011/0271129 A1 * | 11/2011 | Flannagan et al. | 713/323 |
| 2012/0191781 A1 * | 7/2012 | Shen et al. | 709/204 |
| 2012/0212570 A1 * | 8/2012 | Herz et al. | 348/14.08 |

* cited by examiner

*Primary Examiner* — Gerald Gauthier
(74) *Attorney, Agent, or Firm* — Goodwin Procter LLP

(57) ABSTRACT

Improved methods and apparatus for sharing and collaborating around a video source by maintaining and providing to users a list of a plurality of contacts containing both video source device contacts and interactive message source contacts. This allows for collaboration among users by permitting them to communicate with each other around an automatically-shared video source, to interact with automatically shared video sources, and to make decisions based on these shared video sources.

21 Claims, 2 Drawing Sheets

METHODS AND APPARATUS FOR COLLABORATION

FIELD OF THE INVENTION

The present invention relates to collaboration, and in particular to collaboration and sharing of a video source among a plurality of users.

BACKGROUND OF THE INVENTION

The ability to communicate is important, whether it be for social, business, military, or other purposes. To address this need, a multitude of instant-messaging platforms have been developed to allow near-instant communication among users over a network, allowing users to communicate by exchanging text messages.

While they offer speedy communication, current instant messaging applications are user-centric by design. These systems permit individual users to communicate with each other, but do not provide a clean methodology for automated data sources to utilize the instant-messaging network. For example, several prior art instant messaging systems support person-to-person video conferencing that must be actively initiated by a user with a camera device. These prior art systems do not easily allow users to collaborate with each other around an automatically-shared video source Accordingly, there is a need for improved methods and apparatus for sharing and collaborating around a video source.

SUMMARY OF THE INVENTION

The present invention addresses the need for improved methods and apparatus for sharing and collaborating around a video source by maintaining and providing to users a list of a plurality of contacts containing both video source device contacts and interactive message source contacts. This allows for collaboration among users by permitting them to communicate with each other around an automatically-shared video source, to interact with automatically shared video sources, and to make decisions based on these shared video sources.

In one aspect, embodiments of the present invention provide a method for messaging collaboration and include providing a program that enables collaboration among a plurality of users, maintaining a plurality of contacts for a first user where at least one of the contacts is a device sourcing video and at least one of the contacts is an interactive source of messages, and providing a list containing the contacts to the user.

In one embodiment, the video source device contacts and interactive message source contacts are provided in the list without identifying which contact is a video source device and which contact is an interactive message source. Presence information of at least one of the plurality of contacts may also be provided to the first user. In yet another embodiment of the present invention, the plurality of contacts that are in contact with the first user are using a plurality of messaging services.

Additional embodiments of the present invention include receiving a request by a user to communicate with a video source device contact, connecting the user to a shared communication environment that is associated with the video source device contact and displaying within the environment a video feed from the video source device contact. The shared communication environment of these embodiments is accessible to a plurality of users in active communication with the video source device contact. The displaying of the video in these embodiments may be synchronized among a plurality of connected users or unsynchronized. A further embodiment comprises receiving an action from the first user interacting with the video feed and displaying a response to the action that is synchronized among the plurality of connected users in active communication with the video source device contact.

In still another embodiment, the methods further includes monitoring at least one of the video source device contacts for a change in metadata associated with the video source device contact, detecting at least one change in metadata that is associated with the video source device contact, and responding to the detected event. In a further embodiment, the detected event is an alert event. In yet another further embodiment, the step of responding includes connecting a plurality of users to a shared communication environment associated with the detected event where the plurality of users are in active communication with the video source device contact, and displaying within the environment a feed from the video source device contact.

In another aspect, embodiments of the present invention provide a device for messaging collaboration having a processor and a memory coupled to the processor. The memory of the device includes program instructions that, when executed, cause the device to maintain a plurality of contacts for a first user in memory and provide to the first user a list of said plurality of contacts. Of the maintained contacts, at least one of the contacts is a device sourcing video and at least another one of the contacts is an interactive source of messages.

In one embodiment of the present invention, the video source device contacts and interactive message source contacts are provided in the list without identifying which contact is a video source device and which contact is an interactive message source. The program instructions may also be configured when executed to provide presence information for at least one of the plurality of contacts to the first user. In yet another embodiment of the present invention, the plurality of contacts that are in contact with the first user are using a plurality of messaging services.

In additional embodiments of the present invention, the program instructions are further configured, when executed, to programmatically receive a request by a user to communicate with a video source device contact, connect the requesting user to a shared communication environment that is associated with the video source contact and display within the environment a video feed from the video source device contact. The shared communication environment of these embodiments is accessible to a plurality of users in active communication with the video source device contact. The displaying of the video in these embodiments may be synchronized among a plurality of connected users or unsynchronized. In a further embodiment, the program instructions are further configured when executed to programmatically receive an action from the user interacting with the video feed and display a response to the action that is synchronized among the plurality of connected users in active communication with the video source device contact.

In still another embodiment, the program instructions are further configured to monitor at least one of the video source device contacts for a change in metadata associated with the video source device contact, detect at least one change in metadata that is associated with the video source device contact, and respond to the detected event. In one embodiment, the detected event is an alert event. In yet another embodiment, the program instructions are further configured to programmatically connect a plurality of users to a shared communication environment associated with the detected event where the plurality of users are in active communication with the video source device contact and display within the environment a feed from the video source device contact.

In another aspect, embodiments of the present invention provide a device for messaging collaboration having a processor and a memory coupled to the processor. The memory of the device includes program instructions that, when executed, provide an interface between a device sourcing video and a program enabling collaboration among a plurality of users, so that a user receives a list of a plurality of contacts, wherein at least one of the contacts is a device sourcing video and at least one contacts is an interactive source of messages.

In one aspect, embodiments of the present invention provide a method for messaging collaboration and include providing a program that provides an interface between a device sourcing video and a program enabling collaboration among a plurality of users, so that a user receives a list of a plurality of contacts, wherein at least one of the contacts is a device sourcing video and at least one of the contacts is an interactive source of messages.

The foregoing and other features and advantages of the present invention will be made more apparent from the description, drawings, and claims that follow.

BRIEF DESCRIPTION OF DRAWINGS

The advantages of the invention may be better understood by referring to the following drawings taken in conjunction with the accompanying description in which.

DETAILED DESCRIPTION OF THE INVENTION

Figure 1:
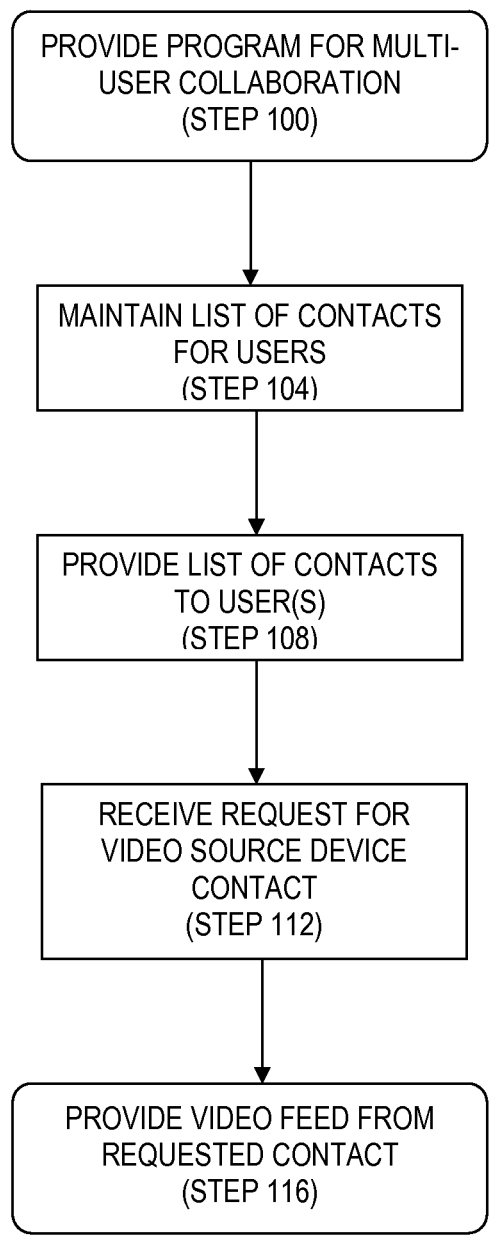
FIG. 1 is a flowchart diagram of an embodiment of the present invention providing collaboration.

FIG. 1 presents a flowchart of one embodiment of a method for collaboration in accord with the present invention. In this method, a program that is enabled for collaboration among a plurality of users is provided (step 100), typically executing on a server computer. The provided program allows for collaboration among users by permitting them to communicate with each other, substantially in real-time. For example, the provided program may enable users to exchange messages with each other ("instant messaging"). The program may be accessed by any number of users interacting with the provided program via a network-connected computing device, such as a desktop computer or smartphone. In some embodiments, a user executes a specialized program that communicates with the provided program, while in other embodiments a user executes a program generally used for network-based communications, such as a web browser or Telnet client.

In one embodiment, the presented program is an instant messaging server program, such as OFFICE COMMUNICATION SERVER offered by Microsoft Corporation of Redmond, Wash., operating in tandem with a separate enhancement program. The enhancement program, when executing, acts as an interface between the server program and various video source devices, providing the server program with what the server program believes to be standard messaging contacts but in actuality are video source devices. As discussed below, the enhancement program allows for the creation of a shared environment among traditional messaging contacts that permits them to collaborate using instant messaging around the video feed from a video source device contact.

The presented program maintains a list of contacts for each user of the program (step 104). Although each user's list of contacts may be different, these differing lists may include contacts common to the lists of several different users. Each list of contacts may be updated from time-to-time or in real time as the user's contacts change. Each contact in the list may be a device sourcing video or an interactive source of messages. A video source device may include, for example, a televised video source, a closed-circuit video source, or a network-connected video source. An interactive message source may include, for example, another user of the system in communication with the presented program, such as a user's friends, family, coworkers or business contacts.

Certain embodiments of the present invention may additionally operate as a multi-protocol gateway among a plurality of messaging systems, thereby giving a user access to a larger network of contacts. This may be especially advantageous when a user of the system seeks to communicate with contacts from business and social settings that are available through different messaging systems.

In operation, the presented program provides each user with a list of his or her contacts (step 108). The list may be provided in a window displayed at the user's computing device. The list may be a subset or an entirety of the user's complete list of contacts. The contacts may be presented in alphabetical order by name or organized according to some user-defined grouping. The appearance of each contact in the list may be differentiated, e.g., according to whether the contact is video source device or an interactive message source. This may be done through the display of an icon representation next to each contact in the list, or through groups that differentiate between video source device contacts and interactive message source contacts. In another embodiment of the present invention, the list may not differentiate among the different types of contacts, seamlessly juxtaposing video source device contacts with interactive message source contacts.

The program may also provide the status information of at least some of the contacts in the user's list. The status information may be explicit, e.g., through a text description, or implicit, e.g., by changing the color of an icon associated with the contact. Status information may include whether the contact is connected to the collaboration server (e.g., "online") or whether the contact is active. A status indicator may also indicate the state of a video source device contact, such as whether the video at the video source device contact is a live video, or a video that is being replayed. The status indicator may also be used to display any errors occurring at the video source contact.

Interaction with a Video Source Device Contact

The program has the capability to receive a request for communication with a video source device contact. This may be accomplished through the choice of a specific contact on the list presented to the user, through textual commands, or other known methods of selecting an option. When the program receives this request for video source device contact (step 112), the program provides video from the requested video source contact (step 116).

The video may be streamed to the user's computing device. For example, where the contact is a televised video source, the result is a live display of the televised video source, such as a broadcast news channel, displayed to the user. A similar display would result at the client's computing device for a closed-circuit video source or any other network-connected video source. By providing this functionality, the provided program allows users to collaborate and make decisions based on the video displayed from the video source device contact. As further examples, where the contact is an emergency broadcast system, a live display of the emergency broadcast system channel is displayed including any current emergency warnings. Where the contact is a command broadcast contact, a live video feed from a military vehicle or a satellite may be displayed to the user. Thus, the ability to contact a live vide source contact allows users to collaborate and make decisions as the displayed events occur.

When the program receives a request for video source device contact (step 112), the requesting user may be connected to a shared communication environment associated with the video source device contact that is the subject of the request. The shared environment is accessible to a plurality of other users in active communication with the video source device contact, allowing the requesting user to communicate with the plurality of other users in an environment that excludes users that are not themselves in active communication with the video source device contact. The video feed associated with the video source device contact may also be displayed as part of this environment, e.g., in a pane in a window on the user interface. The video feed may be synchronized among the plurality of connected users including the requesting user, thus allowing all of the users to see the same images at a particular moment, although unsynchronized video feeds are also within the scope of the present invention. Synchronized video feeds can allow for easier collaboration and remove any uncertainty as to whether a user is commenting on the same displayed images being seen by another user.

The program may also have the capability to receive actions from a user interacting with a video feed. The user may initiate the action by selecting a user interface item, entering text commands or other known methods of command entry. When this occurs, the program may display a response to the user's action and also display the response to the user's action among the plurality of connected users in active communication with the video source device contact in the shared communication environment. Thus, for example, when a user pauses a displayed video, the video may be paused for all users also connected to the shared communication environment associated with that video source contact. Other user commands may be limited to direct interaction with the video source device contact itself, e.g., such as control commands sent to an Unmanned Aerial Vehicle ("UAV") or commands changing a displayed emergency warning at a video source device contact that is also an emergency broadcast channel.

Event Monitoring

Embodiments of the present invention may also monitor video source device contacts for a change in the metadata associated with the contact. Monitored metadata may include time of last update, time of creation, author, length, live or replay status, title, alert status, and other metadata associated with a video source device contact. When a change in the metadata that is associated with the contact is detected, a response to the detected change may be taken. For example, an alert window may be displayed to a user alerting them of the detected change. Alternatively, the user may be informed through e-mail, phone or other forms of communication that a change has been detected, such as when the specified response is an alert event. Therefore, a user does not have to actively monitor each of his or her contacts for the occurrence of certain events, but instead may rely on the program to automatically detect changes in metadata associated with the occurrence of such events.

A user may be automatically connected to a shared communication environment associated with the video source device contact upon the detection of a change in metadata associated with an event. As described previously, this shared environment may be accessible to a plurality of other users in active communication with the video source device contact, allowing the first user to communicate with the plurality of other users. Upon a detection of change in metadata, the video feed associated with the video source device contact may be automatically displayed to the users in the shared communication environment, and that display may be synchronized among the users. As an example, where a video source device from a UAV changes its metadata status to "high alert" status after discovering a target while on a mission, this change would be automatically detected, and a first user having the UAV in his contacts list may be connected to the shared communication environment associated with the UAV. The first user is then able to communicate with the other users having the UAV in their contacts list regarding the UAV's target utilizing the shared communication environment while each of those users views the live video from the UAV.

The Collaboration Sever and Network and Network-connected Devices

Figure 2:
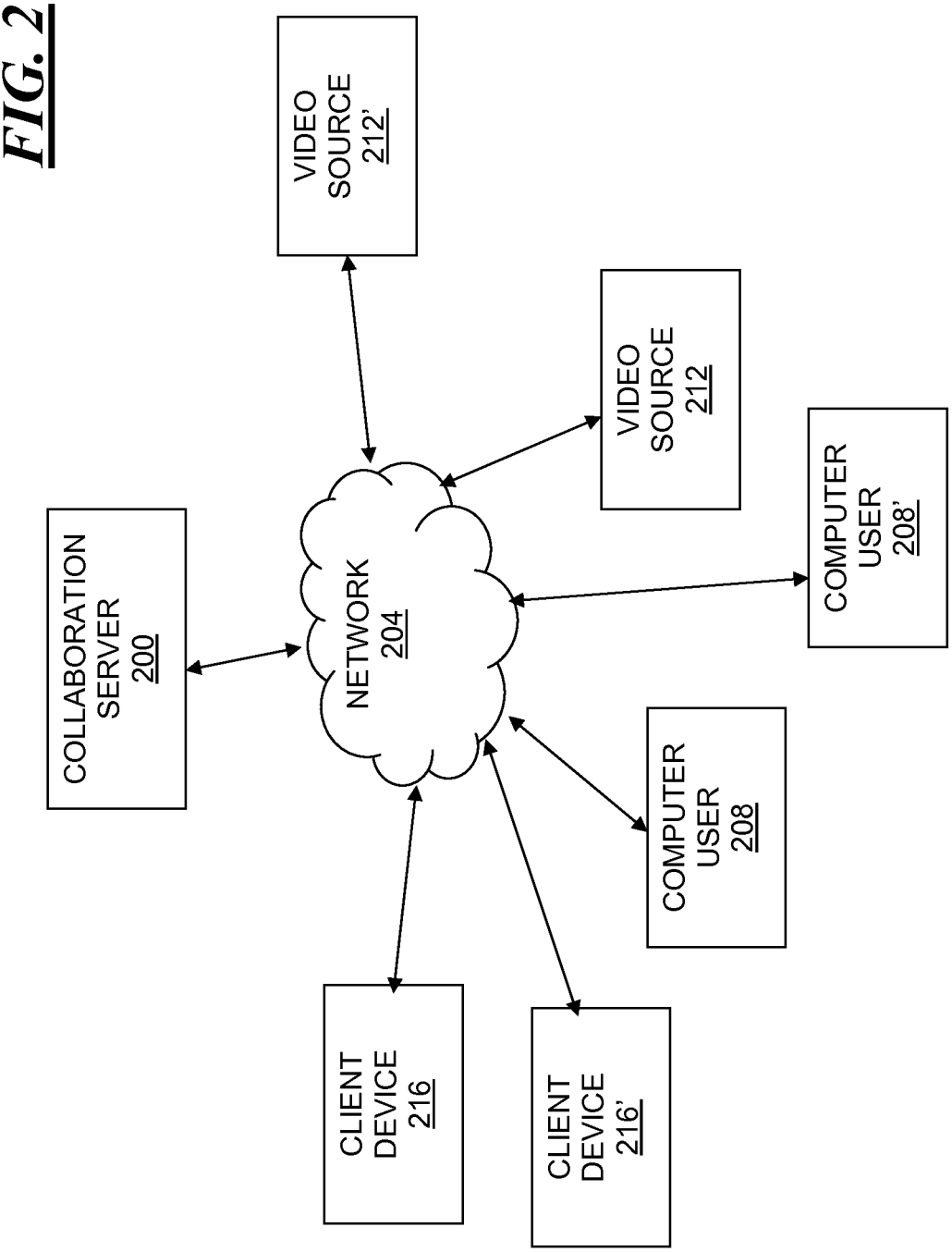
FIG. 2 is a diagram of an embodiment of the present invention providing an apparatus for message collaboration among various devices and users connected to said network

Referring now to FIG. 2, there is shown an embodiment of a collaboration server 200 that is connected a network 204 containing a plurality of connected client devices 216, 216', computer users 208, 208' and video sources 212, 212'. The collaboration server 200 may comprise at least a processor and a memory coupled to the processor (neither shown). In some embodiments, collaboration server 200 may also contain a transceiver that allows for the transmitting and receiving of data communications to and from network 204. The memory comprises program instructions that are configured when executed to allow for collaboration among users by permitting them to communicate with each other through network 204 via the collaboration server 200. The users will be able to communicate with each other, substantially in real-time, such as through instant messaging.

Network 204 can be any network or combination of networks that carry data communications including communications from and to network capable devices. Network 204 may include a local area network or a wide area network, such as the Internet, any combination of wired or wireless data devices, and may support a wide range of protocols and technologies, including those of the World-Wide Web. Certain embodiments of the present invention may additionally operate as a multi-protocol gateway among a plurality of messaging systems, thereby giving a user simultaneous access to several networks of contacts. Thus, users may be able to communicate with other users on network 204 even where the users' network messaging systems differ.

Network 204 may also be connected to a plurality of client devices 216, 216', computer users 208, 208' and video sources 212, 212'. As such, the collaboration server 200 may communicate with any number of devices connected to network 204 and vice versa. As a result, any number of devices connected to network 204 may communicate with any other number of devices also connected to network 204 via the collaboration server 200, thereby allowing communication among the users of these devices. Computer users 208, 208' may be using a computer such as a desktop computer or smartphone to communicate. Users 208, 208' may also be able to communicate with each other using a variety of client devices 216, 216'. The collaboration server 200 also allows for the users at client device 216, 216' and computer users 208,208' to communicate with a number of video sources 212, 212' connected to network 204 and vice versa. Video source 212, 212' may include, for example, any device that is capable of storing or transmitting video data.

At these computers 208, 208' and client devices 216, 216', a user may execute a specialized program that communicates with other devices connected to network 204 via the collaboration server 200, while in other embodiments a user executes a program generally used for network-based communications, such as a web browser or Telnet client, which also communicates with other devices connected to network 204 via the collaboration server 200.

The collaboration server 200 executes program instructions configured to maintain a list of contacts in memory for each user. Although each user's list of contacts may be different, these differing lists may include contacts common to the lists of several different users. Each list of contacts may be updated from time-to-time or in real time as the user's contacts change. Each contact in the list may be a device sourcing video or an interactive source of messages. A video source device contact may be a video source 212, 212' connected to network 204, such as a televised video source, a closed-circuit video source, or a network-connected video source, whereas an interactive message source may include, for example, another user at a client device 216, 216' or computer user 208, 208', such as a user's friends, family, coworkers or business contacts.

In operation, the collaboration server 200 executes program instructions in its memory configured to provide each user with a list of his or her contacts. Each user's contact list, which may be a subset or an entirety of the user's completed list of contacts and may be organized in alphabetical order by name or according to some user-defined order, may be provided to each user as a subset or an entirety of each user's complete list of contacts. The appearance of each contact in the list may be differentiated according to whether the contact is a video source 212, 212' or an interactive message source. The program instructions may be configured when executed to display an icon representation next to each contact in the list, or to differentiate between video source device contacts and interactive message source contacts by the use of grouping. In another embodiment of the present invention, the list may not differentiate among the different types of contacts but rather juxtapose the video source device contacts with the traditional interactive message source contacts.

The program instructions at the collaboration server 200 may also be configured when executed to provide status information for at least some of the contacts contained the user's list, such as whether the contact is connected to the collaboration server 200 or whether the contact is in active communication with the collaboration server 200. The server 200 may also provide status information of video sources 212, 212', such as whether the video at the video source 212, 212' is a live video or a stored video that is being replayed and whether any errors occurred at the video source. It may offer the status information, for example, through a text description or by color icon indications associated with the contact.

The program instructions at the collaboration server 200 may be configured when executed to receive a request for communication with a video source device 212, 212' that is connected to network 204. A computer user 208 may request communication with a video source device 212 by choosing a specific video source contact 212 on the list interface, by sending textual commands indicating a request to communicate with video source contact 212, or by other known methods of selecting an option. When the collaboration server 200 receives a request to communicate with a video source 212, 212', the collaboration server provides video from the requested video source. In one embodiment, in response to a request for communication with a video source device 212, the server 200 may communicate the request to the video source 212 and retransmit any video data received from video source 212 to computer user 208.

The video may be streamed to the user's computing device. In the same example, where the requested video source 212 is a televised video source, the result is a live display of the televised video source, such as a broadcast news channel, displayed to the computer user 208. A similar display would result at the client's computing device for a closed-circuit video source or any other network-connected video source. By providing this functionality, the provided program allows users to collaborate and make decisions based on the video displayed from the video source device contact.

When the collaboration server 200 receives a request for video source device 212, 212', the program instructions may connect the requesting user to a shared communication environment associated with the video source device contact that is the subject of the request. The shared environment is accessible to a plurality of other users in active communication with the video source device contact, allowing the requesting user to communicate with the plurality of other users in an environment that excludes users that are not themselves in active communication with the video source device contact. The video feed associated with the video source 212, 212' may also be displayed as part of this environment, e.g., in a pane in a window on the user interface. The video feed may be synchronized among the plurality of connected users on network 204, including the requesting user, thus allowing all of the users to see the same images at a particular moment, although unsynchronized video feeds are also within the scope of the present invention. Synchronized video feeds can allow for easier collaboration and remove any uncertainty as to whether a user is commenting on the same displayed images being seen by another user.

The program instructions at the collaboration server 200 may also have the capability to receive actions from a user interacting with a video feed from video source 212, 212'. The user may initiate the action by selecting a user interface item, providing text commands, or other known methods of command entry. When this occurs, the collaboration server 200 may cause the display of a response to the user's action and also display the response to the user's action among the plurality of connected users on network 204 in active communication with the video source 212, 212' in the shared communication environment. Other user commands may be limited to direct interaction with the video feed associated with the video sources 212, 212' itself.

In embodiments of the present invention, the program instructions at the collaboration server 200 may be configured to monitor video sources 212, 212' for a change in the metadata associated with the contact such as changes in time of last update, time of creation, author, length, live or replay status, title, alert status, and other metadata associated with a video source device contact. When a change in the metadata that is associated with the contact is detected, a response to the detected change may be taken. For example, the collaboration server 200 may cause an alert window to be displayed at the computer users 208, 208' or client devices 216, 216, alerting them of the detected change. Alternatively, the user may be informed through forms of communication such as e-mail or phone that a change has been detected, for example, when the specified response is an alert event. A user does not then have to actively monitor each of his or her contacts for the occurrence of certain events, but instead may rely on the program to automatically detect changes in metadata associated with the occurrence of such events.

In one embodiment, the collaboration server 200 may cause a user to be automatically connected to a shared communication environment associated with the video source 212 upon the detection of a change in metadata associated with an event. As described previously, this shared environment may be accessible to a plurality of other users in active communication with the video source 212 allowing the user to communicate with the plurality of other users. Upon a detection of change in metadata, the program instructions may be configured when executed to cause the automatic display of the video feed associated with the video source 212 in the shared communication environment. The display may be synchronized among the users in the shared communication environment or it may be unsynchronized.

It will therefore be seen that the foregoing represents a highly advantageous approach for collaboration. The terms and expressions employed herein are used as terms of description and not of limitation and there is no intention, in the use of such terms and expressions, of excluding any equivalents of the features shown and described or portions thereof, but it is recognized that various modifications are possible within the scope of the invention claimed.

What is claimed is:

1. A method for messaging collaboration, comprising:
   providing a program enabling collaboration among a plurality of users;
   maintaining a plurality of contacts for a first user in connection with the program, wherein at least one of the contacts is a non-collaborating device sourcing automatically-shared video and at least one of the contacts is an interactive source of messages; and
   providing to the first user a list of said plurality of contacts.

2. The method of claim 1, wherein said at least one video source device contact and said at least one interactive message source contact are provided without identifying which contact is a video source device and which contact is an interactive message source.

3. The method of claim 1, further comprising:
   receiving a request by the first user to communicate with a video source device contact;
   connecting the first user to a shared communication environment associated with said video source device contact, said environment accessible to a plurality of users in active communication with said video source device contact; and
   displaying within the environment a video feed from the video source device contact.

4. The method of claim 3, wherein said displaying of said video feed is synchronized among a plurality of connected users.

5. The method of claim 3, further comprising:
   receiving an action from the first user interacting with said video feed; and
   displaying a response to said action synchronized among a plurality of connected users in active communication with said video source device contact.

6. The method of claim 1, further comprising providing to the first user presence information for at least one of said plurality of contacts.

7. The method of claim 1, wherein said plurality of contacts are in contact with said first user using a plurality of messaging services.

8. The method of claim 1, further comprising:
   monitoring at least one of said video source device contacts for a change in metadata associated with said video source device contact;
   detecting at least one change in metadata associated with said video source device contact; and
   responding to said detected event.

9. The method of claim 8, wherein said detected event is an alert event.

10. The method of claim 8, said step of responding comprising:
    connecting a plurality of users to a shared communication environment associated with said detected event, said plurality of users in active communication with said video source device contact; and
    displaying within the environment a video feed from said video source device contact.

11. A device for messaging collaboration, comprising:
    a processor, and a memory coupled to the processor wherein the memory comprises program instructions configured to:
    maintain a plurality of contacts for a first user in memory, wherein at least one of the contacts is a non-collaborating device sourcing automatically-shared video and at least one of the contacts is an interactive source of messages; and
    provide to the first user a list of said plurality of contacts.

12. The device of claim 11, wherein said at least one video source device contact and said at least one interactive message source contact are provided without identifying which contact is a video source device and which contact is an interactive message source.

13. The device of claim 11, wherein the program instructions are further configured to:
    programmatically receive a request by the first user to communicate with a video source device contact;
    connect the first user to a shared communication environment associated with said video source device contact, said environment accessible to a plurality of users in active communication with said video source device contact; and
    display within the environment a video feed from the video source device contact.

14. The device of claim 13, wherein said displaying of said video feed is synchronized among a plurality of connected users.

15. The device of claim 13, wherein the program instructions are further configured to:
    receive an action from the first user interacting with said video feed; and
    display a response to said action synchronized among a plurality of connected users in active communication with video source device contact.

16. The device of claim 11, wherein the program instructions are further configured to provide to the first user presence information for at least one of said plurality of contacts.

17. The method of claim 11, wherein said plurality of contacts are in contact with said first user using a plurality of messaging services.

18. The device of claim 11, wherein the program instructions are further configured to:
    monitor at least one of said video source device contacts for change in metadata associated with said video source device contact;
    detect at least one change in metadata associated with said video source device contact; and
    respond to said detected event.

19. The method of claim 18, wherein said detected event is an alert event.

20. The device of claim 18, wherein the program instructions are further configured to:
    connect a plurality of users to a shared communication environment associated with said detected event, said plurality of users in active communication with said video source device contact; and display within the environment a video feed from said video source device contact.

21. A device for messaging collaboration, comprising:

a processor, and a memory coupled to the processor wherein the memory comprises program instructions configured to:

provide an interface between a device sourcing video and a program enabling collaboration among a plurality of users, so that a user receives a list of a plurality of contacts, wherein at least one of the contacts is a non-collaborating device sourcing automatically-shared video and at least one of the contacts is an interactive source of messages.

* * * * *